United States Patent
Bonikowski et al.

[15] 3,694,711
[45] Sept. 26, 1972

[54] APPARATUS FOR DETECTING FAULTS IN ELONGATED FLEXIBLE MATERIAL

[72] Inventors: Zbigniew Bonikowski, London; Bruce Henry Keen, Hounslow, both of England

[73] Assignee: British Insulated Callendar's Cables Limited, London, England

[22] Filed: April 26, 1971

[21] Appl. No.: 137,177

[30] Foreign Application Priority Data

April 27, 1970 Great Britain..........20,025/70

[52] U.S. Cl......................318/6, 318/663, 242/25 X, 242/36 X
[51] Int. Cl..............................................H02p 7/00
[58] Field of Search...................318/6, 7; 244/25, 36

[56] References Cited

UNITED STATES PATENTS

| | | |
|---|---|---|
| 2,603,688 | 7/1952 | Cole et al..................318/6 X |
| 2,712,624 | 7/1955 | Beattie......................318/6 X |
| 3,018,978 | 1/1962 | Graneau et al. ...........318/6 X |
| 3,151,507 | 10/1964 | Canova et al. ..........318/7 UX |
| 3,244,955 | 4/1966 | Turner et al...................318/7 |
| 3,304,705 | 2/1967 | Rathje et al................318/6 X |
| 3,373,332 | 3/1968 | Olsen..........................318/6 X |
| 3,474,311 | 10/1969 | Lewis, Jr. .......................318/6 |

Primary Examiner—T. E. Lynch
Attorney—Webb, Burden, Robinson & Webb

[57] ABSTRACT

Apparatus for passing wire from a reversible supply drum through or past at least one fault detector to a reversible take-up drum and, upon detection of a fault, for automatically decelerating and reversing the movement of the wire comprises reversible means, for instance a split field reversible motor, for driving the wire through the apparatus and a device for integrating the velocity of the wire. A signal generated by the fault detector, when a faulty region of wire passes through or past it, initiates the integrating device and causes the reversible wire-driving means to decelerate the wire and eventually to reverse its direction of movement and to move in the reverse direction until the integrated value of the velocity of the wire is approximately zero. Preferably the wire velocity-integrating device comprises an electrical device for generating a voltage proportional to the linear velocity of the wire being wound on to or from a coil wound on the take-up drum or supply drum and means for integrating the voltage signal generated by the electrical device.

13 Claims, 7 Drawing Figures

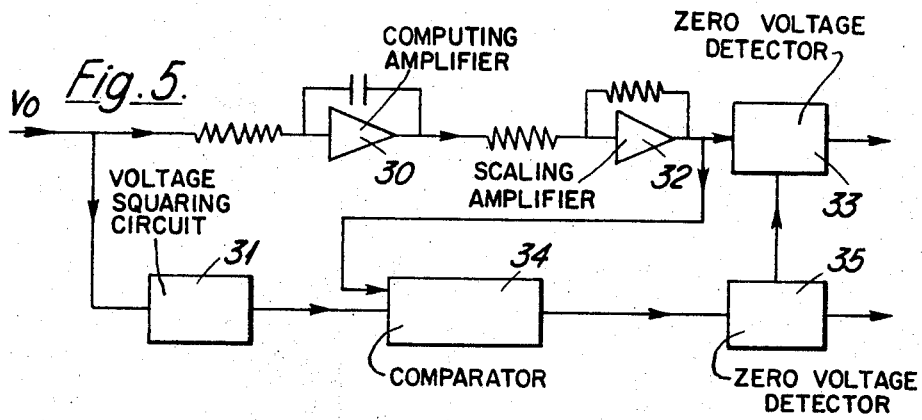
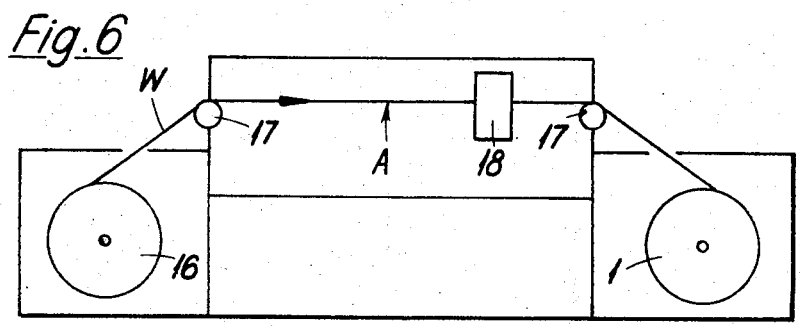
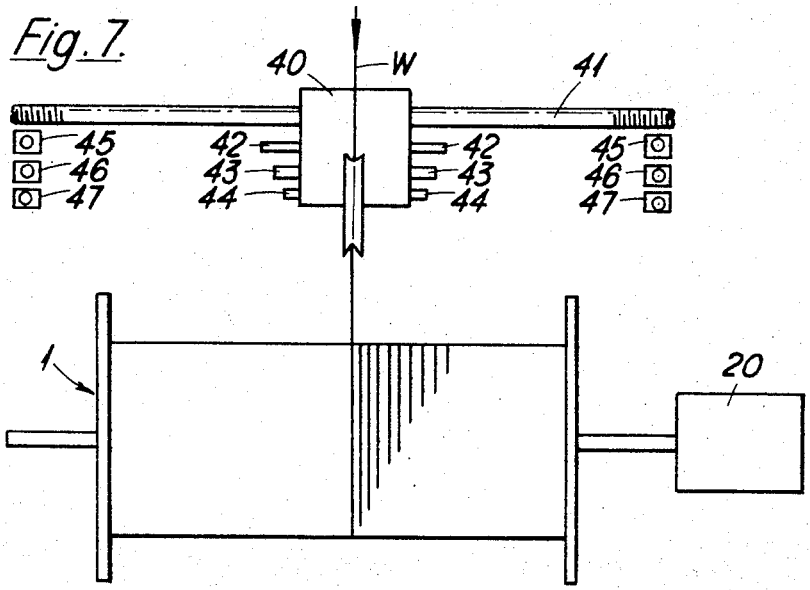

APPARATUS FOR DETECTING FAULTS IN ELONGATED FLEXIBLE MATERIAL

This invention relates to apparatus for detecting faults in elongate flexible material as it passes from a reversible supply source to a reversible take-up device. The invention is especially applicable to the detection of faults in insulated wire passing from a supply drum to a take-up drum and for convenience the flexible material will hereinafter be referred to as "wire" and the supply and take-up devices as "drums".

An object of the invention is to provide apparatus which will pass the wire through or past one or more fault detectors at a high speed, for example 5 m/s higher, and which upon detection of a fault will automatically decelerate and reverse the movement of the wire, in such a way as to return the faulty part of the wire to a position clear of, but adjacent to, the detector or detectors where it can readily be observed and, if necessary, repaired.

In the apparatus in accordance with the invention a signal generated by a fault detector, when a faulty region of a wire passes through or past it, initiates a device for integrating the velocity of the wire and causes means for driving the wire through the apparatus to decelerate the wire and eventually to reverse its direction of movement and to move in the reverse direction until the integrated value of the velocity of the wire (velocity in the reverse direction being taken as negative) is approximately zero. A value slightly less than zero is preferred since this means that the fault will be brought back through or past the detector to a position in which it can be observed and repaired and subsequently re-tested, although a value slightly greater than zero such that the fault is not quite brought back to the detector is equally effective.

The velocity of the wire that is integrated may be the linear velocity of the wire as it passes from a supply drum to a take-up drum or it may be the angular velocity of the wire as it is unwound from or wound on to a drum.

Any means for driving the wire through the apparatus and for measuring its linear or angular velocity can be used but we prefer to drive the wire at a constant linear velocity in the forward direction, and to control its movement in reverse, by means of a take-up drum driven by a reversible electric motor.

It is preferred to use an electronic device for integrating the linear velocity of the wire, although a mechanical integrator could be used.

The linear velocity of the wire is preferably measured by the electrical device in accordance with U.S. patent application Ser. No. 137,554, filed on the same day as the present application or by a metering capstan which drives a tacho-generator, by which a voltage proportional to the linear velocity of the wire is generated, and the voltage signal is preferably integrated by an electronic analogue computing device, for example an operational or virtual earth computing amplifier.

An important advantage of the apparatus in accordance with the invention is that, by carefully designing the profile of the wire linear velocity/time curve for a given time to re-position the fault, it is possible to use a smaller reversing motor for the take-up drum drive than would otherwise be possible. A preferred profile of the wire linear velocity/time curve is shown in FIG. 1 of the accompanying drawings, and this profile gives an integrated voltage/time profile approximately as shown in FIG. 2. In both FIGS. 1 and 2 $T_f$ is the time of occurrence of the fault (at point F on the curve), R is the point of direction and voltage $V_n$ reversal, where $V_n$ is the linear velocity (or voltage signal) under normal running conditions, X is the maximum linear velocity in the reverse direction, preferably $V_n/2$ and Z is the point representing termination of the reverse movement of the wire.

It is preferred to use a split-field reversible motor and to generate the field or armature current, or both, by a DC transistor or thyristor amplifier (e.g. of the kind described in U.S. Pat. No. 3,233,397 which has two output circuits, one connected to each part of the field winding of the motor, which are selectively energized in dependence on whether the DC input of the amplifier is above or below a preset value.

The DC input is preferably derived partly from a ramp function generator and partly from an electrical device in accordance with the above mentioned co-pending application or a metering capstan which maintains the winding speed under normal running conditions constant and generates the voltage (dependent on the linear velocity of the wire) which forms the input of the integrating device.

The invention will be further illustrated by a description, by way of example, of preferred apparatus for passing wire at high speed from a reversible supply drum through or past at least one fault detector to a reversible take-up drum with further reference to the accompanying drawings, in which:

FIG. 5 is a circuit diagram of the integrating device of the apparatus;

FIG. 6 is a diagrammatic representation of the general lay-out of the fault detection apparatus, and FIG. 7 is a diagrammatic representation of preferred flaking gear for the take-up drum.

Figure 3:
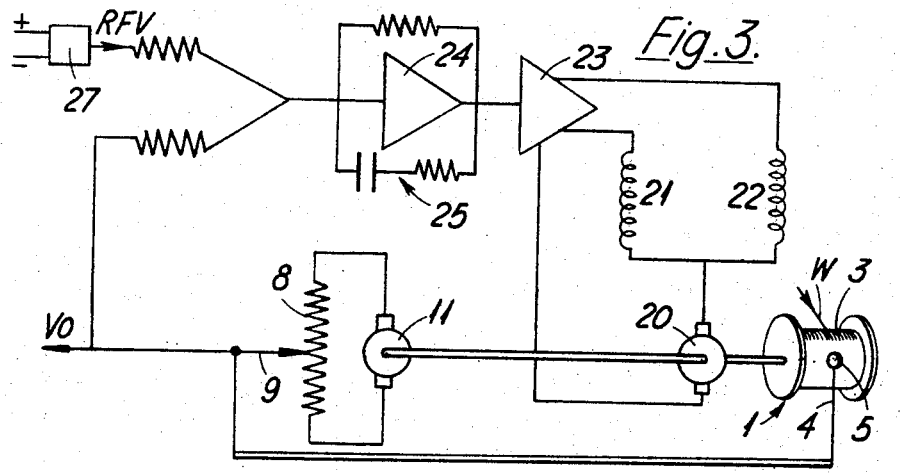
FIG. 3 is a circuit diagram of part of the apparatus.

Referring to FIG. 3 the take-up drum 1 is driven by a split-field, reversible, series motor 20, the opposing field windings 21 and 22 of which are supplied by a DC amplifier 23, of the kind described in the Complete Specification of the above mentioned patent.

The motor 20 also drives a tacho-generator 11 the output of which is connected across a potentiometer 8. The adjusting arm 9 of the potentiometer is controlled by a radius detector, as described in the above mentioned co-pending application and comprising a pivoted feeler arm 4 coupled to the adjusting arm 9 and having mounted on one end a feeler roller 5 which bears on and detects changes in the radius of the coil 3 of wire W being wound on the drum 1. The radius detector provides, with the output RFV of a ramp-function generator 27, the input to the amplifier 23. This input is through an operational type amplifier 24 which effectively isolates the output $V_o$ of the potentiometer 8 from the output RFV of the ramp-function generator 27 and enables the closed loop system to be stabilized by suitably placed capacitance resistance networks, as shown for example at 25. The output voltage/time curve for the ramp function generator 27 is shown in FIG. 4, using the notation of FIGS. 1 and 2, Ts being the start-up time.

Figure 4:
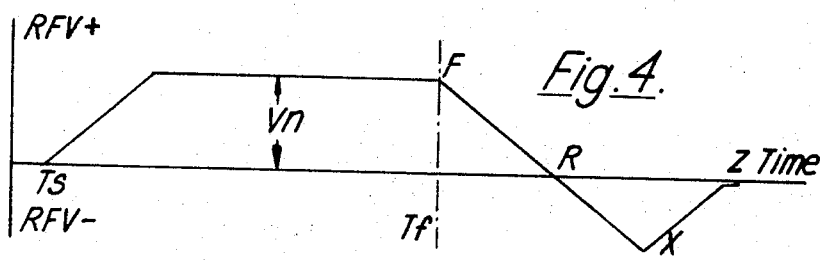
FIG. 4 is the profile of the output voltage/time curve for the ramp function generator of the apparatus.

The fault detector, which may for example be a spark tester for insulated wire, generates a signal, on the occurrence of a fault, which switches on the circuit of the integrating device shown in FIG. 5, and causes the output RFV of the ramp function generator 27 to follow the path F R X in FIG. 4.

Referring to FIG. 5 a voltage Vo, derived from the potentiometer 8 as shown in FIG. 3, is applied to the input of a computing amplifier 30 and to a circuit 31 that squares the voltage Vo. The output of the amplifier 30 is applied through a scaling amplifier 32 to a zero voltage detector 33, hereinafter referred to as the "zero length detector." The squared voltage $(Vo)^2$ is fed, with a signal from the output of the scaling amplifier 32, to a comparator 34 the output of which passes to a second zero voltage detector 35, hereinafter referred to as the "deceleration point detector."

Figure 1:
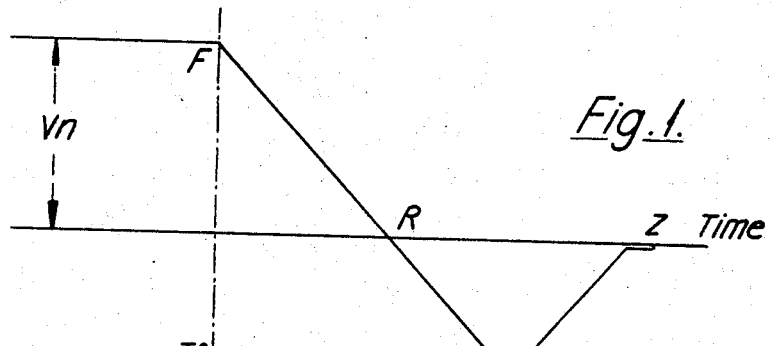
Figure 2:
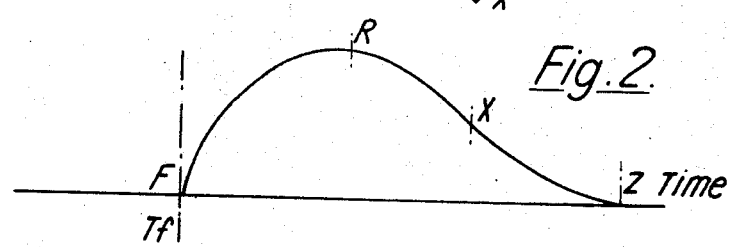

It can be shown that when the integrated voltage is equal to a critical value $Kc$ ($Vo(^2$, for a given deceleration between points X and Z in FIG. 1, the point of inflection X in the curve of FIG. 2 is reached. The point X can be optimized for decelerating the motor 20 during reverse drive. By suitable adjustment of the comparator 34, when this point is reached, the comparator can be caused to produce a zero output and to operate the deceleration point detector 35 to cause it to provide an output signal for controlling the ramp function generator 27 to bring about the required deceleration and thus to bring the speed of the motor 20 nearly to zero, shortly before the output of the computing amplifier 30 reaches zero. The ramp function generator 27 is designed to give uniform low voltage output RFV at this stage, sufficient to inch the motor 20, and which continues until the zero length detector 33 produces an output signal which switches off the ramp function generator and brakes the take-up drum 1.

Referring now to FIG. 6 illustrating diagrammatically the general lay-out of the fault detecting apparatus wire W passes from a supply drum 16 over guide pulleys 17 and through a fault detector 18 onto the take-up drum 1. The take-up drum 1 is driven by a reversible motor 20 as described above and the supply drum 16 is driven through a suitable slipping drive in such a way that, during forward drive of the wire W by the motor 20 an appropriate tension is maintained in the wire, and during reverse rotation of the motor 20 the wire is allowed to rewind onto the supply drum 16.

The zero length detector 33 is adjusted to ensure that, after a fault has been detected in the wire W by the fault detector 18 the motor 20 is reversed to bring the fault back, through the detector, to a predetermined position, e.g. that indicated on the front panel of the apparatus by the arrow A.

To ensure that the zero length detector 33 does not produce an output signal prematurely, i.e during normal running, it is not brought into action until it is unclamped at point X by an output signal from the deceleration point detector 35.

It will be appreciated that a number of different types of fault detectors can be arranged at intervals along the path of the wire and the fault brought back to a different predetermined position in accordance with its nature, e.g. detectors for 'bumps' or voids in the insulation.

The output from the zero length detector 33 preferably also activates a visual and/or audible warning device to indicate to the operator that the wire is ready for repair. The warning signal is preferably arranged to persist until the fault has been repaired.

A difficulty arises in the design of apparatus in accordance with the invention caused by the possible malfunctioning of flaking gear or traversing gear for the take-up drum 1, such flaking or traversing gear including a wire guide device or member movable with respect to the drum to distribute wire evenly turn by turn on the drum barrel, if reversal of the direction of drive coincides with reversal of the flaked member which occurs at the end of the winding of each layer of wire onto the drum barrel.

Another aspect of the invention is the provision of means for avoiding such malfunctioning of flaking gear this is applicable to flaking gear of the kind in which reversal of movement of travel of the flaked member, which may either be the drum or the wire guide, is effected by detectors located adjacent the points of maximum travel of the flaked member. Any form of detector can be used, mechanical, electrical or optical, but for convenience the most common form—micro switches actuated by stops on the wire guide will be described.

In accordance with the invention, at each end of the path of the reciprocal movement of the flaked member, there are two stops and two micro switches, either the stops or the micro switches, or both, being staggered in the direction of movement of the member in such a way that, if reversal of the motor or other means driving the wire through the apparatus takes place immediately after reversal of movement of the member has been effected by actuation of one of the two micro switches, the continued movement of the member that would otherwise take place is reversed by actuation of the second micro switch.

In FIG. 7 which is a diagrammatic drawing showing flaking gear for the take-up drum 1 of the apparatus, on each side of a wire guide 40 running on a traverse screw 41, there are three stops 42, 43 and 44 and three micro switches 45, 46 and 47. The switches 45 and 46 reverse a motor (not shown) driving the traverse screw 41, or a connection between the motor 20 and the screw, and the switches 47 are safety switches which stop the reversible motor 20 in the case of malfunction. It will be appreciated that each of the micro switches 45 and 46 must be of a kind which allow continued movement of the wire guide after actuation of the switch.

What we claim as our invention is:

1. Apparatus for passing wire from a reversible supply drum via at least one fault detector to a reversible take-up drum and, upon detection of a fault, for automatically decelerating and reversing the movement of the wire, which apparatus comprises reversible means for driving the wire through the apparatus and a device for integrating the velocity of the wire, the arrangement being such that a signal generated by the fault detector, when a faulty region of wire passes the fault detector, initiates the integrating device and causes the reversible wire-driving means to decelerate the wire and eventually to reverse its direction of movement and to move in the reverse direction until the integrated value of the velocity of the wire is approximately zero.

2. Apparatus for passing wire from a reversible supply drum via at least one fault detector to a reversible takeaup drum and, upon detection of a fault, for automatically decelerating and reversing the movement of the wire, which apparatus comprises a reversible electric motor coupled to the take-up drum for drawing the wire in the forward direction through the apparatus and a device for integrating the velocity of the wire, the arrangement being such that a signal generated by the fault detector, when a faulty region of wire passes the fault detector, initiates the integrating device and causes the reversible motor to decelerate the wire and eventually to reverse its direction of movement and to move in the reverse direction until the integrated value of the velocity of the wire is approximately zero.

3. Apparatus as claimed in claim 1 wherein the device for integrating the velocity of the wire is an electronic device.

4. Apparatus for passing wire from a reversible supply drum via at least one fault detector to a reversible take-up drum and, upon detection of a fault, for automatically decelerating and reversing the movement of the wire, which apparatus comprises reversible means for driving the wire through the apparatus and a device for integrating the linear velocity of the wire comprising an electrical device for generating a voltage proportional to the linear velocity of the wire being wound on to or from a coil wound on one of the drums and means for integrating the voltage signal generated by the electrical device, the arrangement being such that a signal generated by the fault detector, when a faulty region of wire passes the fault detector, initiates the device for integrating the linear velocity of the wire and causes the reversible wire-driving means to decelerate the wire and eventually to reverse its direction of movement and to move in the reverse direction until the integrated value of the linear velocity of the wire is approximately zero.

5. Apparatus as claimed in claim 4, wherein the means for integrating the voltage signal generated by the electrical device is an electronic analogue computing device.

6. Apparatus for passing wire from a reversible supply drum via at least one fault detector to a reversible take-up drum on which a coil of the wire is wound and, upon detection of a fault, for automatically decelerating and reversing the movement of the wire, which apparatus comprises a reversible electric motor coupled to the take-up drum for drawing the wire in the forward direction through the apparatus and a device for integrating the linear velocity of the wire comprising means for deriving a voltage signal representing the angular velocity of the take-up drum, means for deriving a voltage signal representing the radius of the coil of wire being wound on the take-up drum, means for multiplying these two voltage signals together to produce a voltage signal representing the linear velocity of the wire, and means for integrating the voltage signal representing the linear velocity of the wire, the arrangement being such that a signal generated by the fault detector, when a faulty region of wire passes the fault detector, initiates the device for integrating the linear velocity of the wire and causes the reversible motor to decelerate the wire and eventually to reverse its direction of movement and to move in the reverse direction until the integrated value of the linear velocity of the wire is approximately zero.

7. Apparatus as claimed in claim 6, wherein the device for integrating the linear velocity of the wire includes a tachogenerator, driven by the take-up drum; a potentiometer having an adjusting arm, the output of the tacho-generator being connected across the potentiometer; and a detector capable of measuring the radius of the coil of wire on the take-up drum, the adjusting arm of the potentiometer being actuated by the radius detector to produce a voltage signal representing the linear velocity of the wire.

8. Apparatus for passing wire from a reversible supply drum via at least one fault detector to a reversible take-up drum on which a coil of the wire is wound and, upon detection of a fault, for automatically decelerating and reversing the movement of the wire, which apparatus comprises a split-field reversible motor coupled to the take-up drum for drawing the wire in the forward direction through the apparatus, at least one current of the field current and armature current of the motor being generated by a D.C. amplifier which has two output circuits, one connected to each part of the field winding of the motor which are selectively energized in dependence on whether the D.C. input of the amplifier is above or below a preset value, and a device for integrating the linear velocity of the wire comprising means for deriving a voltage signal representing the angular velocity of the take-up drum, means for deriving a voltage signal representing the radius of the coil of wire being wound on the take-up drum, means for multiplying these two voltage signals together to produce a voltage signal representing the linear velocity of the wire, and means for integrating the voltage signal representing the linear velocity of the wire, the arrangement being such that a signal generated by the fault detector, when a faulty region of wire passes the fault detector, initiates the device for integrating the linear velocity of the wire and causes the reversible motor to decelerate the wire and eventually to reverse its direction of movement and to move in the reverse direction until the integrated value of the linear velocity of the wire is approximately zero.

9. Apparatus as claimed in claim 8, wherein the D.C. input is composed in part by the output of a ramp function generator and in part by the voltage signal produced by multiplying together the voltage signal representing the angular velocity of the take-up drum and the voltage signal representing the radius of the coil of wire being wound on the take-up drum.

10. Apparatus as claimed in claim 4, wherein the voltage proportional to the linear velocity of the wire is applied to the inputs of a computing amplifier and a circuit that squares said voltage, the output of the computing amplifier being applied through a scaling amplifier to a zero length detector and the squared voltage being fed, with a signal from the output of the scaling amplifier, to a comparator whose output is fed to a deceleration point detector.

11. Apparatus as claimed in claim 1, wherein the wire is arranged to be moved in the reverse direction until the integrated value of the velocity of the wire is a value slightly less than zero such that the fault will be brought back beyond the detector.

12. Apparatus as claimed in claim 1, in which there is associated with the take-up drum, flaking gear of the kind in which reciprocal movement of a flaked member guides each layer of wire on to a coil of wire being wound on the drum, wherein means is provided for avoiding malfunctioning of the flaking gear if reversal of the flaked member, effected by detectors located adjacent the points of maximum travel of the flaked member, coincides with reversal of the direction of drive of the wire.

13. Apparatus as claimed in claim 12, wherein at each end of the path of the reciprocal movement of the flaked member, there are a pair of stops and a pair of micro-switches, at least one pair of the pair of stops and the pair of micro-switches being staggered in the direction of movement of the member in such a way that, if reversal of the means driving the wire through the apparatus takes place immediately after reversal of movement of the member has been effected by actuation of one of the pair of micro-switches, the continued movement of the member that would otherwise take place is reversed by actuation of the other micro-switch.

* * * * *